April 18, 1939.  H. E. BROOKS  2,155,005
OILING SYSTEM
Filed Sept. 9, 1935
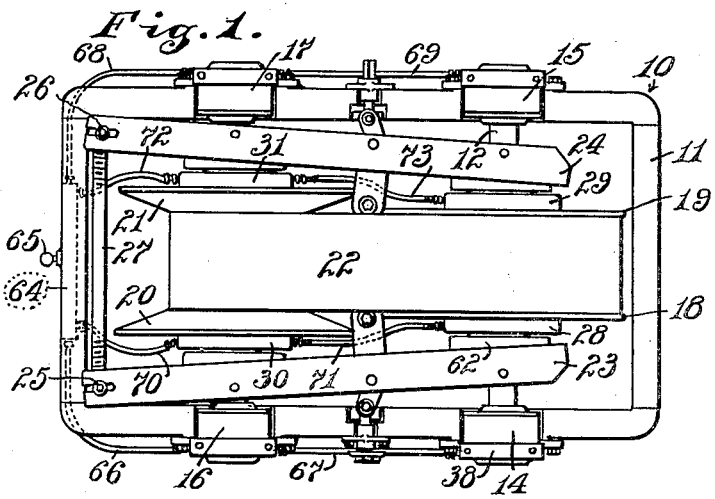
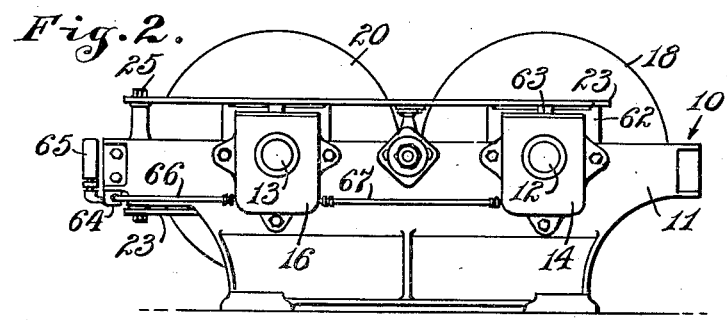
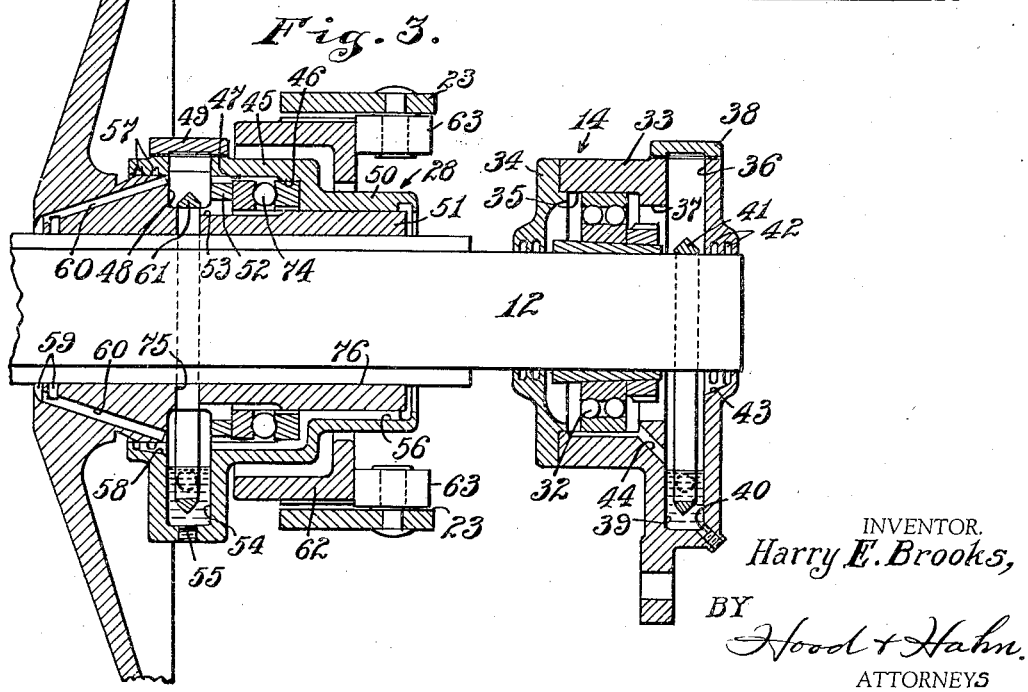
INVENTOR.
Harry E. Brooks,
BY
Hood + Hahn
ATTORNEYS Patented Apr. 18, 1939

2,155,005

UNITED STATES PATENT OFFICE 2,155,005

OILING SYSTEM

Harry E. Brooks, Columbus, Ind., assignor to Reeves Pulley Company, Columbus, Ind., a corporation of Indiana Application September 9, 1935, Serial No. 39,808

7 Claims. (Cl. 184—6)

The present application relates to an oiling system for the well known "Reeves" type of variable speed transmission. In the past, almost universal practice has been to lubricate the shaft bearings and disc bearings of such transmissions with grease, rather than with oil; but there are numerous obvious disadvantages in such a system. However, any lubricating system for transmissions of this character should be substantially automatic, at least over relatively long periods of time.

The primary object of the present invention, then, is to provide a gravity-feed type of liquid lubricating system for transmissions of the character above mentioned, which shall be entirely automatic to supply ample quantities of lubricant to the shaft bearings and to the disc bearings of such a transmission over long periods of time, without attention. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a plan view of a "Reeves" type variable speed transmission to which the oiling system of the present application has been applied;

Fig. 2 is a side elevation thereof; and

Fig. 3 is an enlarged section through a portion of one of the shafts and two typical bearings.

Referring more particularly to the drawing, it will be seen that I have indicated the transmission generally by the reference numeral 10, said transmission comprising a frame 11 in which are journaled two parallel shafts 12 and 13. The shaft 12 is journaled in bearings enclosed in housings 14 and 15, suitably mounted in the frame 11; and the shaft 13 is journaled in bearings enclosed in housings 16 and 17, likewise mounted in frame 11. Of these housings, the housing 14 is typical; the housing 16 being identical therewith and the housings 15 and 17 being allochiral with respect thereto.

Coned discs 18 and 19 are slidably mounted upon the shaft 12; and similar coned discs 20 and 21 are slidably mounted upon the shaft 13. Each of said disc pairs comprises an expansible V-pulley; and a V-belt 22 operatively connects said pulleys.

The various discs are adapted to be positioned by means of a pair of levers 23 cooperating with the discs 18 and 20, and a pair of levers 24, cooperating with the discs 19 and 21. Said levers are pivoted intermediate their ends, the lever 23 being actuated by a nut 25, and the lever 24 being actuated by a nut 26; said nuts being mounted upon a screw shaft 27. A bearing housing 28 is mounted between the lever 23 and the disc 18, a bearing housing 29 is mounted between the lever 24 and the disc 19, a bearing housing 30 is mounted between the lever 23 and the disc 20, and a bearing housing 31 is mounted between the lever 24 and the disc 21. Of these, the bearing housing 28 is typical; the bearing housing 30 being substantially identical therewith and the bearing housings 29 and 31 being substantially allochiral with respect thereto.

The details of construction within the housings 14 and 28 and their substantial counterparts are illustrated in Fig. 3. While only one housing 14, and only one housing 28 with their enclosed parts will be described, it is to be understood that the construction and contents of the housings 15, 16 and 17 correspond to the construction and contents of the housing 14; and that the construction and contents of the housings 29, 30 and 31 correspond to the construction and contents of the housing 28.

A ball bearing 32 in which the shaft 12 is directly journaled is enclosed within the housing which is indicated generally by the reference numeral 14. That housing comprises a main body 33 formed to provide a chamber 35 immediately enclosing the bearing 32, closed by a cover element 34. Said body element 33 is likewise formed to provide an enlarged chamber 36 axially spaced from the chamber 35, with which it communicates through a reduced passage 37. The chamber 36 is closed at its upper end by a suitable cover 38; and provides, at its lower end, a lubricant reservoir 39 provided with a plugged drain port 40. Within the chamber 36, an oil ring 41 is carried upon the shaft 12, said ring dipping into the lubricant in the reservoir 39. It will be obvious that, as the shaft 12 rotates, the ring 41 will be spun to carry lubricant from the reservoir 39 at least up to the uppermost periphery of the shaft 12.

The outer wall of the element 33, in which the shaft 12 rotates, is formed with oil trapping grooves 42 which communicate with a passage 43 leading downwardly and inwardly to the chamber 36, to conduct oil, which might otherwise tend to seep out of the housing around the periphery of the shaft 12, back to the reservoir 39. Similarly, the cover element 34 is formed with oil trapping grooves and may, if desired, be provided with a passage leading downwardly into the chamber 35. An oil passage 44 leads downwardly from the chamber 35 into the chamber 36 to discharge oil into the reservoir 39.

The area of sliding engagement between the discs 18, 19, 20 and 21 and the respective shafts 12 and 13 must also be lubricated; as must the thrust bearings within the housings 28, 29, 30 and 31 interposed between the levers 23 and 24 and their respective discs. To this end, the housing 28 (and each of its counterparts) comprises a main shell 45 formed to provide a pocket 46 snugly receiving one race of the thrust bearing 74. The other race of said bearing snugly engages a shoulder 52 formed on the hub 51 of the disc 18.

With the pocket 46 communicates a chamber 47 which, in turn, communicates with an enlarged chamber 48 closed at its top by a cover element 49. The opposite end of the shell 45 is reduced, as at 50, to engage snugly the said hub 51 of the disc 18. One or more passages 53 provide communication between the inner periphery of the bearing 74 and the enlarged chamber 48.

Said enlarged chamber is formed to provide a reservoir 54 having a plugged drain port 55. One or more passages 56 lead in a generally radially outward direction from the periphery of the shaft 12 and the periphery of the hub 51, to the reservoir 54, to return oil which might otherwise escape from the housing.

At its opposite end, the housing 28 is formed with oil trapping grooves 57, and one or more passages 58 lead generally radially outward from the bases of said grooves to the reservoir 54. Similarly, the portion of the disc 18 adjacent the summit of the cone frustum is internally formed with oil trapping grooves 59 with which communicate one or more passages 60 leading generally radially outward from the bases of said grooves to the chamber 48 and so to the reservoir 54.

An oil ring 61 is carried on the hub 51 within the chamber 48 and dips into the oil in the reservoir 54 for the purpose of carrying oil upwardly from said reservoir at least to the uppermost periphery of said hub 51.

An operating collar 62 is interposed between a suitably formed shoulder on the shell 45 and rollers 63 carried on the levers 23, to transmit movement between said levers and said shell.

At 65, I have shown a constant level bottle-type reservoir associated with a distributing header 64 mounted at one end of the frame 11; but it will be obvious that said reservoir may be mounted at any suitable point.

A tube 66 leads from the header 64 to the reservoir 39 formed in the housing 16; and a tube 67 leads from said reservoir 39 in the housing 16 to the reservoir 39 in the housing 14. Similarly, a tube 68 leads from the header 64 to the reservoir 39 in the housing 17; and a tube 69 leads from said reservoir 39 in the housing 17 to the reservoir 39 in the housing 15. A flexible tube 70 leads from the header 64 to the reservoir 54 in the housing 30; and a flexible tube leads from said reservoir 54 in the housing 30 to the reservoir 54 in the housing 28. Similarly, a flexible tube 72 leads from the header 64 to the reservoir 54 in the housing 31; and a flexible tube 73 leads from the reservoir 54 in the housing 31 to the reservoir 54 in the housing 29.

It will be entirely obvious that, as a result of this arrangement, the oil level in all of the housings will be maintained substantially at the same constant position. It will be seen that that level is disposed below the lowermost peripheries of the bearings 32 and 74; and that oil supplied to the various bearings and to the sliding mountings of the discs must be carried thereto by the rings 41 and 61.

It may appear that substantially no oil will flow through the ports 75 to the keyways 76 in the hubs 51 of the discs, since centrifugal force tends to prevent such flow. It has been found, however, in actual practice, that oil is supplied so plentifully to the various parts within the housings 28, 29, 30 and 31 that the shafts and keyways are sufficiently lubricated.

I claim as my invention:

1. The combination with a shaft bearing, of a housing enclosing said bearing, said housing providing a chamber immediately surrounding said bearing, and an enlarged chamber axially spaced from said first-named chamber, means for substantially maintaining a predetermined level of liquid lubricant in said enlarged chamber below said bearing, and means for lifting lubricant to the level of said bearing, said housing being formed with a passage leading radially outward from said first-named chamber to said enlarged chamber.

2. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said element being formed to provide at least one passage leading radially outward from the periphery of said shaft to said reservoir.

3. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said housing being formed to provide at least one passage leading radially outward from the periphery of said shaft to said reservoir.

4. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said housing being formed to provide at least one passage leading radially outward from said bearing to said reservoir.

5. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said housing being formed to provide at least one passage leading radially outward from the periphery of said shaft and from said bearing to said reservoir.

6. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said element being formed to provide at least one passage leading radially outward from the periphery of said shaft to said reservoir, and said housing being formed to provide at least one passage leading radially outward from the periphery of said shaft to said reservoir.

7. In combination, a shaft, an element slidably mounted on said shaft, a housing enclosing a portion of said element, a thrust bearing operatively interposed between said housing and said element, a reservoir formed in said housing, means for substantially maintaining a level of liquid lubricant in said reservoir below said shaft, and means for lifting lubricant from said reservoir to the uppermost periphery of said shaft to lubricate said bearing and the slidable connection between said shaft and said element, said element being formed to provide at least one passage leading radially outward from the periphery of said shaft to said reservoir, and said housing being formed to provide at least one passage leading radially outward from the periphery of said shaft and from said bearing to said reservoir.

HARRY E. BROOKS.